US012380570B2

(12) United States Patent
Fan et al.

(10) Patent No.: US 12,380,570 B2
(45) Date of Patent: Aug. 5, 2025

(54) IMAGE PROCESSING METHOD AND APPARATUS, AND HARDWARE APPARATUS

(71) Applicant: Beijing Microlive Vision Technology Co., Ltd, Beijing (CN)

(72) Inventors: Xu Fan, Beijing (CN); Yan Li, Beijing (CN)

(73) Assignee: Beijing Microlive Vision Technology Co., Ltd, Beijing (CN)

( * ) Notice: Subject to any disclaimer, the term of this patent is extended or adjusted under 35 U.S.C. 154(b) by 521 days.

(21) Appl. No.: 17/286,193

(22) PCT Filed: Jan. 25, 2019

(86) PCT No.: PCT/CN2019/073084
§ 371 (c)(1),
(2) Date: Apr. 16, 2021

(87) PCT Pub. No.: WO2020/077914
PCT Pub. Date: Apr. 23, 2020

(65) Prior Publication Data
US 2021/0350545 A1   Nov. 11, 2021

(30) Foreign Application Priority Data
Oct. 19, 2018   (CN) .......................... 201811222642.0

(51) Int. Cl.
*G06T 7/149*   (2017.01)
*G06F 16/68*   (2019.01)
(Continued)

(52) U.S. Cl.
CPC ............ *G06T 7/149* (2017.01); *G06F 16/686* (2019.01); *G06T 7/13* (2017.01); *G06T 7/564* (2017.01);
(Continued)

(58) Field of Classification Search
None
See application file for complete search history.

(56) References Cited

U.S. PATENT DOCUMENTS 9,358,456 B1 *   6/2016   Challinor ................ A63F 13/44
9,743,033 B2 *   8/2017   Kim ........................ G11B 27/28
(Continued)

FOREIGN PATENT DOCUMENTS

| CN | 1879158 A | 12/2006 |
| CN | 101458821 A | 6/2009 |

(Continued)

OTHER PUBLICATIONS

Tzanetakis, George, et al. "Audio Analysis Using the Discrete Wavelet Transform." Proc. Conf. in Acoustics and Music Theory Applications, vol. 66, Citeseer, 2001. (Year: 2001).*

(Continued)

*Primary Examiner* — Matthew C Bella
*Assistant Examiner* — Johnny B Duong
(74) *Attorney, Agent, or Firm* — BakerHostetler

(57) ABSTRACT

The disclosure discloses an image processing method and apparatus, and a hardware apparatus. The image processing method includes the following steps: an audio is acquired, and then is preprocessed to obtain audio attribute data at each first time point of the audio; first audio attribute data corresponding to a current time point is acquired; and preset processing is performed on an image to be processed according to the first audio attribute data. According to the image processing method of the embodiments of the disclosure, when performing preset processing on the image to be processed according to the audio attribute data, the image processing can be completed only by setting the relationship (Continued)

between the audio attribute data and the image processing operation, which improves the flexibility and efficiency of image processing.

12 Claims, 4 Drawing Sheets

(51) Int. Cl.
    *G06T 7/13*           (2017.01)
    *G06T 7/564*         (2017.01)
    *G10H 1/36*          (2006.01)
    *G10H 1/40*          (2006.01)
    *H04N 23/80*        (2023.01)

(52) U.S. Cl.
    CPC ............... *G10H 1/368* (2013.01); *G10H 1/40* (2013.01); *H04N 23/80* (2023.01)

(56) References Cited

U.S. PATENT DOCUMENTS

| | | | | |
|---|---|---|---|---|
| 11,392,642 | B2* | 7/2022 | Zhou | ...................... G06V 10/44 |
| 2008/0095512 | A1* | 4/2008 | Murabayashi | ..... H04N 21/4325 |
| | | | | 386/E5.052 |
| 2010/0302253 | A1* | 12/2010 | Kipman | .................. G06T 13/40 |
| | | | | 345/473 |
| 2018/0197578 | A1* | 7/2018 | Ridder | ................. G11B 27/031 |

FOREIGN PATENT DOCUMENTS

| | | |
|---|---|---|
| CN | 105574814 A | 5/2016 |
| CN | 107644423 A | 1/2018 |
| CN | 108124101 A | 6/2018 |
| CN | 108257609 A | 7/2018 |
| CN | 108495036 A | 9/2018 |
| JP | 2002-112113 A | 4/2002 |
| JP | 2010-147587 A | 7/2010 |
| JP | 2011-250100 A | 12/2011 |
| WO | WO-2015194509 A1 * | 12/2015 ............ G06T 13/80 |

OTHER PUBLICATIONS

Abid K et al, "OpenCV Python Tutorials, Contours in OpenCV" (Jun. 3, 2015). User-Friendly Link: https://docs.opencv.org/3.0.0/d3/d05/tutorial_py_table_of_contents_contours.html. (Year: 2015).*
Au, Kelvin. "Circular Audio Wave—JS Library for Audio Visualization in Circular Waveform." Medium, Jul. 14, 2018, https://medium.com/@kelvinausoftware/circular-audio-wave-js-library-for-audio-visualization-in-circular-waveform-49afe0aa87a. (Year: 2018).*
Justin Odisho; "How to make Anything React to Music & Audio in Adobe Effects! (CC Tutorial)"; https://www.youtube.com/watch?v=ZmmTA9N5ySw; YouTube; May 2017; accessed May 22, 2023; 6 pages.
International Patent Application No. PCT/CN2019/073084; Int'l Search Report; dated Jul. 15, 2019; 2 pages.
Written Opinion for International Application No. PCT/CN2019/073084, mailed Jul. 15, 2019, 6 Pages.

* cited by examiner

US 12,380,570 B2

IMAGE PROCESSING METHOD AND APPARATUS, AND HARDWARE APPARATUS

CROSS-REFERENCE TO RELATED APPLICATION

The disclosure is the national phase application of International Patent Application No. PCT/CN2019/073084, titled "IMAGE PROCESSING METHOD AND APPARATUS, AND HARDWARE APPARATUS", filed on Jan. 25, 2019, which claims priority to Chinese Patent Application No. 201811222642.0, filed on Oct. 19, 2018, titled "Image Processing Method and Apparatus, and Hardware Apparatus", the entire contents of which are incorporated herein by reference.

TECHNICAL FIELD

The disclosure relates to the field of image processing, and particularly relates to an image processing method and apparatus, and a hardware apparatus.

BACKGROUND

With the development of computer technologies, the application range of intelligent terminals has been extensively enlarged. For example, people can listen to music, play games, chat on line, take photos, and the like through the intelligent terminals. With regards to the photographing technique of the intelligent terminals, its photo pixels have reached more than 10 million pixels, with high definition and a photographing effect comparable to that of professional cameras.

At present, when taking photos with an intelligent terminal, camera software built in at the factory can be used to achieve a photographing effect with a traditional function, and an application (APP for short) can also be downloaded from a network terminal to achieve a photographing effect with additional functions, such as an APP that can realize functions of dark light detection, photo retouching, Ultra-Pixel and the like. The face retouching function of the intelligent terminal usually includes skin color adjustment, skin smoother, eyes retouching and skinny face feature and other beauty processing effects, which can perform the same degree of face retouching on all faces that have been identified in an image. There are also APPs that can implement simple special effects.

However, as far as the current special effects features are concerned, the special effects can only be preset and then synthesized into a video or an image. If a special effect needs to be modified, it needs to be re-made and then synthesized into the video or image, which makes the generation of the special effects inflexible.

SUMMARY

According to one aspect of the disclosure, the following technical solutions are provided:

An image processing method, comprising: acquiring an audio and preprocessing the audio to obtain audio attribute data at each first time point of the audio; acquiring first audio attribute data corresponding to a current time point; and performing preset processing on an image to be processed according to the first audio attribute data.

According to another aspect of the disclosure, the following technical solutions are also provided:

An image processing apparatus, comprising:
an audio attribute data acquisition module, configured for acquiring an audio and preprocessing the audio to obtain audio attribute data at each first time point of the audio;
a first audio attribute data acquisition module, configured for acquiring first audio attribute data corresponding to a current time point; and
an image processing module, configured for performing preset processing on an image to be processed according to the first audio attribute data.

According to another aspect of the disclosure, the following technical solutions are provided:

An electronic device, comprising: a memory, configured for storing a non-transitory computer-readable instruction; and a processor, configured for executing the computer-readable instruction to cause the processor to perform the steps described in any of the above methods.

According to another aspect of the disclosure, the following technical solutions are provided:

A computer-readable storage medium, storing a non-transitory computer-readable instruction that upon execution by a computing device, causes the computing device to perform the steps described in any of the above methods.

The disclosure discloses an image processing method and apparatus, and a hardware apparatus. The image processing method includes the following steps: an audio is acquired, and then is preprocessed to obtain audio attribute data at each first time point of the audio; first audio attribute data corresponding to a current time point is acquired; and preset processing is performed on an image to be processed according to the first audio attribute data. According to the image processing method of the embodiments of the disclosure, when performing preset processing on the image to be processed according to the audio attribute data, the image processing can be completed only by setting the relationship between the audio attribute data and the image processing operation, which improves the flexibility and efficiency of image processing.

The above description is only an overview of the technical solution of the disclosure. In order to have a clearer understanding of the technical means of the disclosure, they can be implemented in accordance with the content of the specification, and to make the above and other objectives, features, and advantages of the disclosure more obvious and understandable, the following is a detailed description of the preferred embodiments in conjunction with the accompanying drawings.

DETAILED DESCRIPTION OF THE DISCLOSURE

Particular specific examples illustrate the embodiments of the disclosure below, and those skilled in the art can easily understand other advantages and effects of the disclosure from the content disclosed in this specification. It is apparent that the embodiments described are merely a part of the embodiments of the disclosure, not all the embodiments. The disclosure can also be implemented or applied through other different specific embodiments, and various details in this specification can also be modified or changed based on different viewpoints and applications without departing from the spirit of the disclosure. It should be noted that the embodiments below and features in the embodiments may be combined with each other without conflicts. Based on the embodiments in the disclosure, all other embodiments obtained by those of ordinary skill in the art without creative work shall fall within the protection scope of the disclosure.

It should be noted that various aspects of the embodiments within the scope of the appended claims are described below. It should be obvious that the aspects described herein can be embodied in a wide variety of forms, and any particular structure and/or function described herein are only illustrative. Based on the disclosure, those skilled in the art should understand that one aspect described herein can be implemented independently of any other aspects, and two or more of these aspects can be combined in various ways. For example, any number of aspects set forth herein can be used to implement devices and/or practice methods. In addition, other structures and/or functionalities, besides one or more of the aspects set forth herein, may be used to implement the device and/or the method.

It should also be noted that the figures provided in the following embodiments only illustrate the basic idea of the disclosure in a demonstrative manner. The figures only show components related to the disclosure, but are not drawn according to the number, shapes and sizes of components in actual implementation. The type, quantity, and proportion of each component can be changed at will in practice, and the layout type of components may also be more complicated.

In addition, in the following description, specific details are provided to facilitate a thorough understanding of the examples. However, those skilled in the art will understand that the aspects may be practiced without these specific details.

Figure 1:
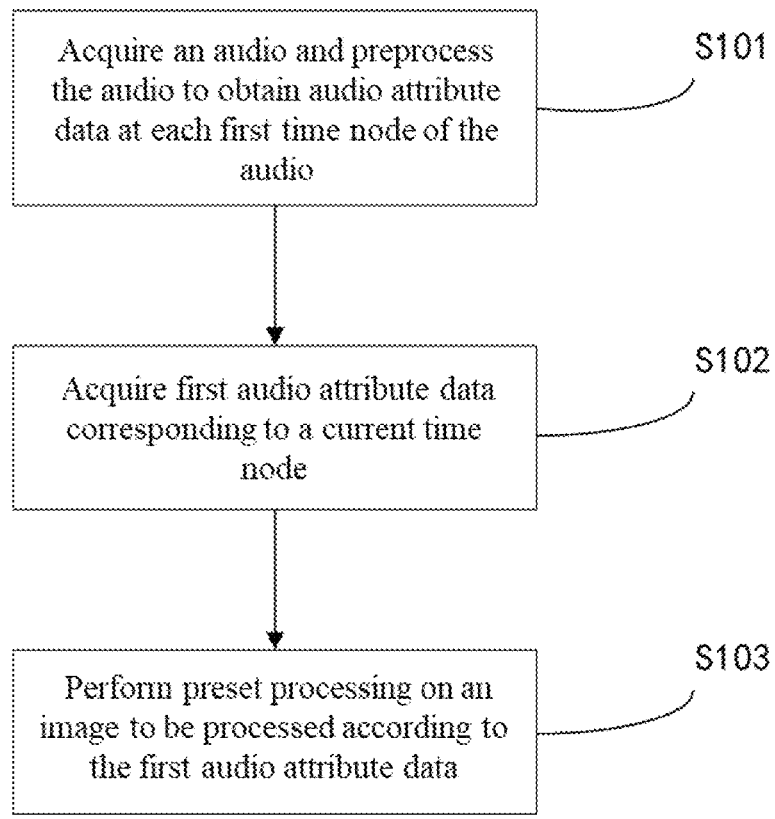
FIG. 1 is a flow diagram of an image processing method according to one embodiment of the disclosure.
Figure 2A:
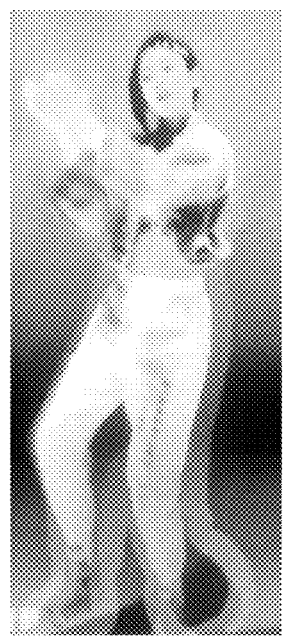
FIGS. 2a to 2d are schematic diagrams of one example according to an image processing effect of the disclosure.
Figure 2B:
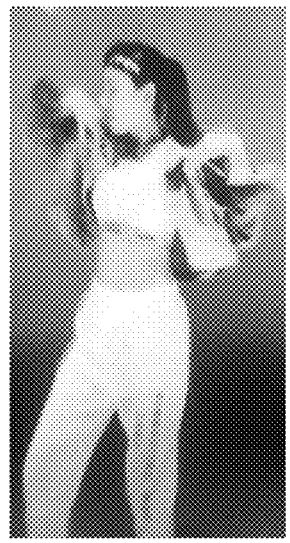
Figure 2C:
Figure 2D:
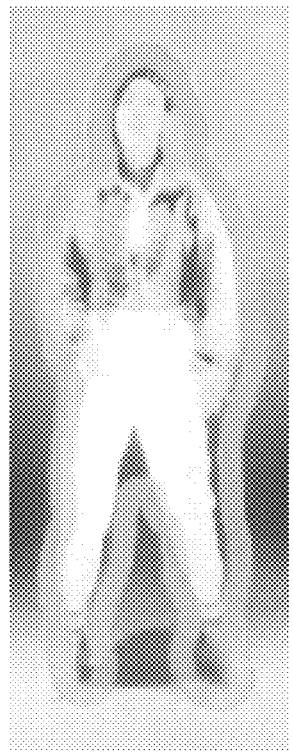

An embodiment of the disclosure provides an image processing method. The image processing method provided by the present embodiment can be implemented by a calculating apparatus. The calculating apparatus may be implemented as software or a combination of software and hardware. The calculating apparatus may be integrated into a server, a terminal device, and the like. As shown in FIG. 1, the image processing method mainly includes the steps S101 to S103.

At step S101: an audio is acquired, and the audio is preprocessed to obtain audio attribute data at each first time point of the audio.

In one embodiment, the audio and an image to be processed are independent of each other. The image may be a dynamic image such as a video or a dynamic graph, or may be a static image such as a picture. In this embodiment, an audio to be used is acquired, and is then preprocessed. The preprocessing may include parsing the audio in order of time points; the time points may be set according to a sampling frequency. In this embodiment, an interval between the time points may be set to be 10 ms, that is, a time point is sampled every 10 ms to parse the audio attribute data at that time point. The audio attribute data may be any attribute of the audio, typically such as a sound intensity, a tone, a timbre, a duration and a rhythm. In this embodiment, taking a rhythmic intensity as an example of the audio attribute data, the rhythmic intensity can be set to have five levels, for each time point, the audio is parsed to obtain the level of the rhythmic intensity at this time point, and after the audio is parsed, a correspondence relationship between the time point and the corresponding level of the rhythmic intensity can be obtained. In this embodiment, a mapping table can be used to store this correspondence relationship.

In another embodiment, the audio is associated with the image to be processed. The image can be a dynamic image such as a video or a dynamic graph, or a static image such as a picture. The association can typically be that the audio and the image to be processed have a correspondence relationship. For example, when a video is played or a picture is opened, the audio is played together with the video or the picture. In this case, the audio is typically an audio in the video or an audio built in the picture. In this embodiment, an audio to be used is acquired, and is then preprocessed. The preprocessing can be parsing the audio in order of time points. The time points can be set according to a sampling frequency. In this embodiment, a sampling rate can be related to an attribute of an image. For example, if the image is a video, and the video has 30 video frames per second, an interval between the time points can be 33 ms, that is, time point is sampled every 33 ms, and therefore, the time points correspond to the video frames. Or, if the image is a dynamic graph, there are also a plurality of frames of pictures in the dynamic graph, and the time at which each frame of the picture is regarded as a time point. If the image is a static picture, a time point can be set optionally. Of course, when the image is the video or the dynamic graph, a time point can also be set optionally, which will not be repeated herein. The audio attribute data at the time point is parsed. The audio attribute data may be any attribute of the audio, typically such as a sound intensity, a tone, a timbre, a duration and a rhythm. In this embodiment, taking a rhythmic intensity as an example of the audio attribute data, the rhythmic intensity can be set to have five levels, for each time point, the audio is parsed to obtain the level of the rhythmic intensity at this time point, and after the audio parsed, a correspondence relationship between the time point and the corresponding level of the rhythmic intensity can be obtained. In this embodiment, a mapping table can be used to store this correspondence relationship.

In the mapping table, the time point includes a time point ID and audio attribute data corresponding to the ID. The time point ID can typically be a serial number of the time point in a time point sequence.

At step S102: first audio attribute data corresponding to a current time point is acquired.

In one embodiment, the audio and the image to be processed are independent of each other. Under such circumstances, a time point when the audio is played currently is acquired. If the current playback time is not precisely at the time point, the current time point can be determined in an upward or downward rounding manner. A mapping table generated in the step S102 is searched according to the current time point, so that audio attribute data corresponding to the current time point is acquired, and recorded as the first audio attribute data. Typically, the serial number of the time point can be used to search, from the mapping table, the audio attribute data corresponding to the time point with the same serial number, and the audio attribute data is regarded as the first audio attribute data.

In another embodiment, the audio is associated with the image to be processed. For example, when the audio is an audio in a video, in accordance with the sampling method in the step S101, time points are sampled according to the frequency at which video frames appear, and under such circumstances, the video frames and the time points of the audio have a correspondence relationship. Therefore, the serial numbers of the video frames have a one-to-one correspondence with that of the time points of the audio and thus the current time point, recorded as a second time point, can be directly acquired by means of the video frames. The serial number of the second time point is used to search, from the mapping table, the audio attribute data corresponding to the time point with the same serial number, and the audio attribute data is regarded as the first audio attribute data.

At step S103: preset processing is performed on the image to be processed according to the first audio attribute data.

In one embodiment, the preset processing is performed on a target object in the image to be processed according to the first audio attribute data. The image to be processed may include a plurality of objects. An object needing to be processed may be preset to be a target object, and a relationship between the audio attribute data and the preset processing is preset, and may be set by means of the mapping relationship. Typically, a direct correspondence relationship between different audio attribute data and the preset processing can be directly set, or a relationship between the audio attribute data and the preset processing may also be indirectly set. Typically, the audio attribute data is used as a parameter to calculate a first parameter required by the preset processing, and the first parameter is used to set the preset processing. In this embodiment, the image may be a static picture. Under such circumstances, different processing effects can be shown on a static object on the static picture as the audio plays.

In another embodiment, the preset processing is performed on a target object in a current image frame according to the first audio attribute data. The current image frame may include a plurality of objects, and the image frame may be processed by the processing method as described in the above embodiment. In this embodiment, the image to be processed may be a video. As the video plays, the form of the target object in each video frame may possibly change, and the processing for each video frame may also change with the time points of the audio, showing an effect that a special effect on the target object in the video changes with the change of the audio.

In one embodiment, before the step S103, the method further includes a step of preprocessing the image to be processed, and the preprocessing the image to be processed includes:

the image to be processed is segmented to obtain a contour of the target object;
inner contour feature points of the target object are generated according to the contour of the target object; and
outer contour feature points are generated according to the inner contour feature points.

The image to be processed may be any image. In one embodiment, the image to be processed is a picture, wherein a target image includes a target object. The target object may be any object. In one embodiment, the target object is the human body. The target image is segmented to segment the object in the image, and this object is separated from other objects to obtain the contour of the target object. In one embodiment, when the target image is a video, the video needs to be acquired at first, and a video frame image in the video is segmented; the target object in the video frame image is separated from other objects; and thus the contour of the target object is obtained.

The inner contour feature points of the target object are generated according to the contour of the target object obtained in the previous step. The inner contour feature points may be directly located on a contour line of the target object, or kept at a predetermined distance from the contour line. For example, the inner contour feature points may be kept from the contour line by 0.1 cm. In one embodiment, distances between the inner contour feature points are the same, that is, the inner contour feature points are uniformly distributed relative to the contour of the target object.

The outer contour feature points are generated according to the inner contour feature points generated in the previous step. In one embodiment, the outer contour feature points are interpolated in a direction of the inner contour feature points, wherein the direction is away from the target object. Taking the human body as an example of the target object, the inner contour feature points are located on the contour line of the human body, and for each inner contour feature point, the corresponding outer contour feature point is interpolated on the outer side of the human body.

An area consisting of the inner contour feature points and the outer contour feature points is generated by means of the above three steps, and is located between the inner contour feature points and the outer contour feature points. In this embodiment, the step that the preset processing is performed on the image to be processed according to the first audio attribute data includes: an attribute of a preset material is set according to the first audio attribute data; and the area between the inner contour feature points and the outer contour feature points is filled with the preset material. In one embodiment, the first audio attribute data includes audio rhythmic intensity information, and the step that the attribute of the preset material is set according to the first audio attribute data includes: one or more of a width, a brightness and a display duration of the preset material are set according to the audio rhythmic intensity information. In one embodiment, the rhythmic intensity of the audio includes five levels. For each level, a width, a brightness and a display duration of a corresponding material may be set; after the level of the rhythmic intensity of the audio is acquired, the width, the brightness and the display duration of the material are also set; and then, the area between the inner contour feature points and the outer contour feature points is filled with the set material to form a processing effect of using the material to contour the target object. In this embodiment, the material may be a color card, a picture and the like. The disclosure does not specifically limit the type of the material.

Of course, the preset processing disclosed in the disclosure may be any in processing mode, and is not limited to the above processing mode. The above processing mode is an example for facilitating the understanding.

As shown in FIGS. 2a to 2d, an effect example of the image processing method disclosed by the disclosure for processing an image is illustrated. In this embodiment, the target object is the human body. The human body is contoured to highlight the position of the human body in the image. As shown in FIGS. 2a to 2d, the human body in the image is dancing, accompanied with music. FIGS. 2a to 2d respectively show different contouring effects presented by four rhythm levels, and the ranking of the rhythm speeds, from fast to slow, are as follows: 2c, 2d, 2a and 2b.

The disclosure discloses an image processing method and apparatus, and a hardware apparatus. The image processing method includes the following steps: an audio is acquired, and then is preprocessed to obtain audio attribute data at each first time point of the audio; first audio attribute data corresponding to a current time point is acquired; and preset processing is performed on an image to be processed according to the first audio attribute data. According to the image processing method of the embodiments of the disclosure, when performing preset processing on the image to be processed according to the audio attribute data, the image processing can be completed only by setting the relationship between the audio attribute data and the image processing operation, which improves the flexibility and efficiency of image processing.

Hereinbefore, although all the steps in the above method embodiments are described in the above order, those skilled in the art should make clear that the steps in the embodiments of the disclosure are not necessarily executed in the above order, and can also be executed in reverse order, parallel, interleaved, and other orders. Moreover, on the basis of the above steps, those skilled in the art can also add other steps, and these obvious modifications or equivalent substitutions should also fall within the protection scope of the disclosure, and will not be repeated herein.

An apparatus embodiment of the disclosure is described below. The apparatus embodiment of the disclosure can be configured for executing the steps implemented in the method embodiments of the disclosure. For convenience of description, only parts that are related to the embodiments of the disclosure are shown. Specific technical details that are not disclosed refer to the method embodiments of the disclosure.

Figure 3:
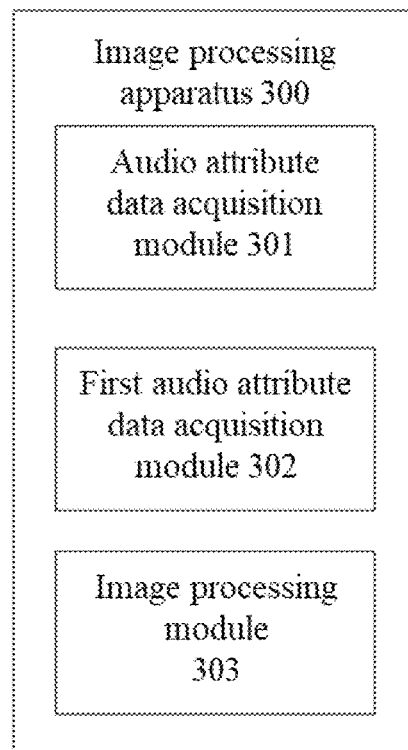
FIG. 3 is a schematic structural diagram of an image processing apparatus according to one embodiment of the disclosure.

An embodiment of the disclosure provides an image processing apparatus. The apparatus can execute the steps in the above image processing method embodiment. As shown in FIG. 3, the apparatus 300 mainly includes an audio attribute data acquisition module 301, a first audio attribute data acquisition module 302, and an image processing module 303.

The audio attribute data acquisition module 301 is configured for acquiring an audio and preprocessing the audio to obtain audio attribute data at each first time point of the audio.

The first audio attribute data acquisition module 302 is configured for acquiring first audio attribute data corresponding to a current time point.

The image processing module 303 is configured for performing preset processing on an image to be processed according to the first audio attribute data.

Further, the audio attribute data acquisition module 301 is configured for acquiring an audio, and parsing the audio to obtain a mapping table between each first time point in the audio and the audio attribute data.

Further, the first audio attribute data acquisition module 302 is configured for acquiring a current playback time point of the audio, and acquiring, according to the mapping table, first audio attribute data corresponding to the current playback time point.

Further, the image processing module 303 is configured for performing preset processing on a target object in the image to be processed according to the first audio attribute data.

Further, the audio attribute data acquisition module 301 is configured for acquiring an audio associated with the image to be processed, and parsing the audio to obtain the mapping table between each first time point in the audio and the audio attribute data.

Further, the first audio attribute data acquisition module 302 is configured for acquiring a second time point corresponding to a current image frame of the image to be processed, and acquiring, according to the mapping table, first audio attribute data corresponding to the second time point.

Further, the image processing module 303 is configured for performing the preset processing on the target object in the current image frame according to the first audio attribute data.

Further, the image processing apparatus further includes a to-be-processed image preprocessing module configured for segmenting the image to be processed to obtain a contour of the target object, generating inner contour feature points of the target object according to the contour of the target object, and generating outer contour feature points according to the inner contour feature points.

Further, the image processing module 303 further includes a material setting module and a filling module, wherein the material setting module is configured for setting an attribute of a preset material according to the first audio attribute data, and the filling module is configured for filling the preset material into an area between the inner contour feature points and the outer contour feature points.

Further, the first audio attribute data includes audio rhythmic intensity information; the material setting module is configured for setting one or more attributes including at least one of a width, a brightness and a display duration of the preset material according to the audio rhythmic intensity information.

The apparatus shown in FIG. 3 can implement the method of the embodiment shown in FIG. 1. The part that is not described in detail in the embodiment may refer to related descriptions of the embodiment shown in FIG. 1. An execution process and technical effects of this technical solution refer to the description in the embodiment shown in FIG. 1, and will not be repeated herein.

Figure 4:
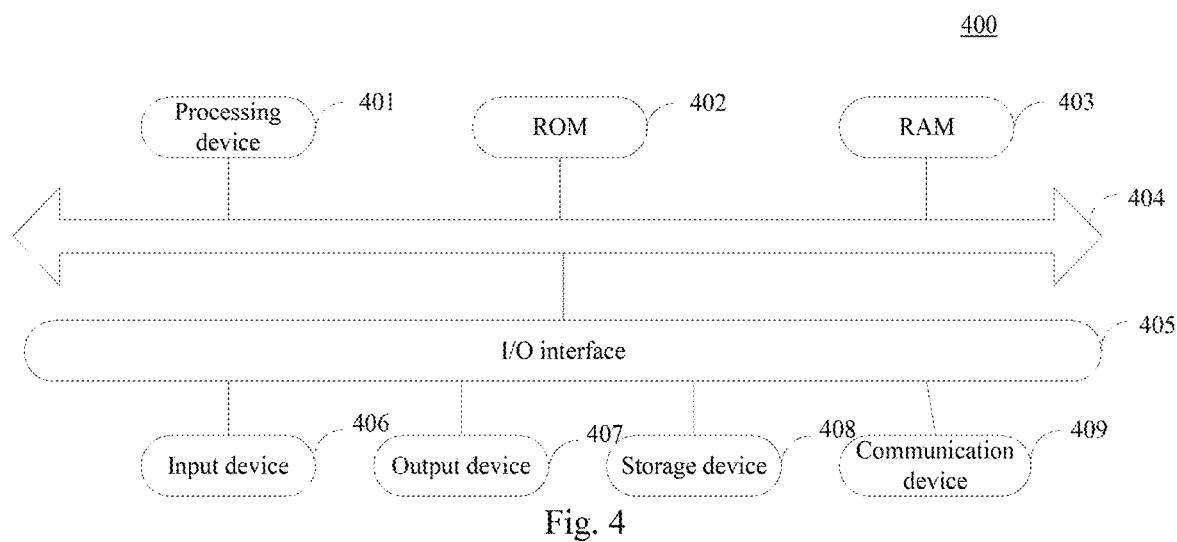
FIG. 4 is a schematic structural diagram of an electronic device provided by the embodiments of the disclosure.

Referring now to FIG. 4, a structural schematic diagram of terminal equipment 400 suitable for implementing an embodiment of the disclosure is shown. The terminal equipment in the embodiment of the present disclosure can include, but is not limited to, mobile terminals such as a mobile phone, a notebook computer, a digital broadcast receiver, a personal digital assistant (PDA), a Pad, a portable media player (PMP) and a vehicle-mounted terminal (e.g., vehicle-mounted navigation terminal), and fixed terminals such as a digital TV and a desktop computer. The terminal equipment shown in FIG. 4 is only an example, and should not bring any restrictions on the functions and application scope of the embodiments of the present disclosure.

As shown in FIG. 4, the terminal equipment 400 can comprise a processing device (e.g., central processing unit, graphics processor, etc.) 401, which can perform various appropriate actions and processing according to a program stored in a read-only memory (ROM) 402 or a program loaded into a random access memory (RAM) 403 from a storage device 408. In the RAM 403, various programs and data required for the operation of the terminal equipment 400 are also stored. The processing device 401, the ROM 402, and the RAM 403 are connected through a bus 404. An Input/Output (I/O) interface 405 is also connected to the bus 404.

Generally, the following devices can be connected to the I/O interface 405: an input device 406 such as a touch screen, a touch pad, a keyboard, a mouse, a camera, a microphone, an accelerometer and a gyroscope; an output device 407 such as a liquid crystal display (LCD), a speaker and a vibrator; a storage device 408 such as a magnetic tape and a hard disk; and a communication device 409. The communication device 409 can allow the terminal equipment 400 to perform wireless or wired communication with other equipment to exchange data. Although FIG. 4 shows the terminal equipment 400 with various devices, it should be understood that it is not required to implement or provide all the devices shown. More or fewer devices may alternatively be implemented or provided.

Particularly, according to the embodiments of the disclosure, the processes described above with reference to the flowcharts may be implemented as computer software programs. For example, the embodiments of the disclosure comprise a computer program product comprising a computer program carried by a computer-readable medium, and the computer program contains program codes for executing the method shown in the flowcharts. In such embodiment, the computer program can be downloaded and installed from a network through the communication device 409, or installed from the storage device 408, or installed from the ROM 402. When the computer program is executed by the processing device 401, the above functions defined in the method of the embodiments of the disclosure are executed.

It should be noted that the above-mentioned computer-readable medium can be a computer-readable signal medium or a computer-readable storage medium or any combination of the two. The computer-readable storage medium may be, for example, but not limited to, an electrical, magnetic, optical, electromagnetic, infrared or semiconductor system, device or component, or any combination of the above. More specific examples of the computer-readable storage medium may include, but are not limited to, an electrical connector with one or more wires, a portable computer disk, a hard disk, an RAM, an ROM, an electrically erasable programmable read only memory (EPROM) or flash memory, an optical fiber, a portable compact disc read-only memory (CD-ROM), an optical storage device, a magnetic storage device, or any suitable combination of the above. In the disclosure, the computer-readable storage medium can be any tangible medium containing or storing a program, which can be used by or in combination with an instruction execution system, device or component. In the disclosure, the computer-readable signal medium can comprise a data signal propagated in a baseband or as part of a carrier wave, in which computer-readable program codes are carried. This propagated data signal can take various forms, including but not limited to an electromagnetic signal, an optical signal or any suitable combination of the above. The computer-readable signal medium can also be any computer-readable medium other than the computer-readable storage medium, and the computer-readable signal medium can send, propagate or transmit the program for use by or in connection with the instruction execution system, device or component. The program codes contained in the computer-readable medium can be transmitted by any suitable medium, including but not limited to electric wire, optical cable, radio frequency (RF) or any suitable combination of the above.

The computer-readable medium can be included in the terminal equipment, and can also exist alone without being assembled into the terminal equipment.

The computer-readable medium carries one or more programs, and when the one or more programs are executed by the terminal equipment, the terminal equipment is caused to: acquire an audio and preprocess the audio to obtain audio attribute data at each first time point of the audio; acquire first audio attribute data corresponding to a current time point; and perform preset processing on an image to be processed according to the first audio attribute data.

Computer program codes for performing the operations of the disclosure can be written in one or more programming languages or a combination thereof, including object-oriented programming languages such as Java, Smalltalk, C++, and conventional procedural programming languages such as "C" language or similar programming languages. The program code can be completely or partially executed on a user computer, executed as an independent software package, partially executed on a user computer and partially executed on a remote computer, or completely executed on a remote computer or server. In a case involving a remote computer, the remote computer can be connected to a user computer through any kind of network including a local area network (LAN) or a wide area network (WAN), or can be connected to an external computer (e.g., connected through the Internet using an Internet service provider).

The flowcharts and block diagrams in the drawings show the architectures, functions and operations of possible implementations of systems, methods and computer program products according to various embodiments of the disclosure. In this regard, each block in the flowchart or block diagram can represent a module, a program segment or part of a code that contains one or more executable instructions for implementing a specified logical function. It should also be noted that in some alternative implementations, the functions noted in the blocks can also occur in a different order from those noted in the drawings. For example, two consecutive blocks can actually be executed in substantially parallel, and sometimes they can be executed in reverse order, depending on the functions involved. It should also be noted that each block in the block diagrams and/or flowcharts, and combinations of blocks in the block diagrams and/or flowcharts, can be implemented with dedicated hardware-based systems that perform specified functions or actions, or can be implemented with combinations of dedicated hardware and computer instructions.

The modules or units described in the embodiments of the disclosure can be implemented by software or hardware. The name of a module or unit does not constitute a limitation to the module or unit itself under certain circumstances. For example, the audio attribute data acquisition module can also be described as "a module for acquiring an audio and preprocessing the audio to obtain audio attribute data at each first time point of the audio".

The above description is only a preferred embodiment of the disclosure and an explanation of the applied technical principles. Those skilled in the art should understand that the scope of disclosure involved in this disclosure is not limited to the technical solutions formed by the specific combination of the above technical features, and should also cover other technical solutions formed by any combination of the above technical features or their equivalent features without departing from the above disclosed concept. For example, the above-mentioned features and the technical features disclosed in (but not limited to) the disclosure having similar functions are replaced with each other to form a technical solution.

What is claimed is:

1. An image processing method of generating an effect in a video, comprising:
   acquiring an audio and preprocessing the audio to obtain audio attribute data at each first time point of the audio;
   identifying a target object comprised in at least one subset of image frames of the video;
   generating an area in each of the at least one subset of the image frames based on a location of the target object in each of the at least one subset of the image frames, wherein the generating an area in each of the at least one subset of the image frames further comprises:
   generating a first plurality of feature points in each of the at least one subset of the image frames based on a contour of the target object and a predetermined distance from the contour of the target object, wherein the target object comprises a human body comprised in the at least one subset of image frames of the video, generating a second plurality of feature points in a direction away from the target object and the first plurality of feature points, and generating the area in each of the at least one subset of the image frames based on the first plurality of feature points and the second plurality of feature points;

filling a visual material into the area in each of the at least one subset of the image frames, wherein the visual material comprises a picture; and generating the effect in the video by adjusting at least one attribute of the visual material based on the audio attribute data.

2. The image processing method according to claim 1, wherein the acquiring an audio and preprocessing the audio to obtain audio attribute data at each first time point of the audio comprises:

acquiring an audio and parsing the audio to obtain a mapping table between each first time point of the audio and the audio attribute data.

3. The image processing method according to claim 2, further comprising:

acquiring a current playback time point of the audio; and acquiring, according to the mapping table, first audio attribute data corresponding to the current playback time point.

4. The image processing method according to claim 1, further comprising:

performing preset processing on the target object in the at least one subset of frames according to the first audio attribute data.

5. The image processing method according to claim 1, wherein the acquiring an audio and preprocessing the audio to obtain audio attribute data at each first time point of the audio comprises:

acquiring an audio associated with the image to be processed; and parsing the audio to obtain a mapping table between each first time point in the audio and the audio attribute data.

6. The image processing method according to claim 5, wherein the acquiring first audio attribute data corresponding to a current time point comprises:

acquiring a second time point corresponding to a current image frame of the image to be processed; and acquiring, according to the mapping table, first audio attribute data corresponding to the second time point.

7. The image processing method according to claim 1, further comprising:

performing preset processing on the target object in a current image frame according to the first audio attribute data.

8. The image processing method according to claim 1, wherein the audio attribute data includes audio rhythmic intensity information, and wherein attributes of the visual material comprise a width, a brightness, and a display duration of the visual material.

9. An electronic device, comprising:

a processor; and a memory communicatively coupled to the processor and storing executable instructions that upon execution by the processor cause the electronic device to perform operations comprising:

acquiring an audio and preprocessing the audio to obtain audio attribute data at each first time point of the audio;

identifying a target object comprised in at least one subset of image frames of a video;

generating an area in each of the at least one subset of the image frames based on a location of the target object in each of the at least one subset of the image frames, wherein the generating an area in each of the at least one subset of the image frames further comprises:

generating a first plurality of feature points in each of the at least one subset of the image frames based on a contour of the target object and a predetermined distance from the contour of the target object, wherein the target object comprises a human body comprised in the at least one subset of image frames of the video, generating a second plurality of feature points in a direction away from the target object and the first plurality of feature points, and generating the area in each of the at least one subset of the image frames based on the first plurality of feature points and the second plurality of feature points;

filling a visual material into the area in each of the at least one subset of the image frames, wherein the visual material comprises a picture; and generating an effect in the video by adjusting at least one attribute of the visual material based on the audio attribute data.

10. A non-transitory computer-readable storage medium, storing a computer-readable instruction that upon execution by a computing device, causes the computing device to perform operations comprising:

acquiring an audio and preprocessing the audio to obtain audio attribute data at each first time point of the audio;

identifying a target object comprised in at least one subset of image frames of a video;

generating an area in each of the at least one subset of the image frames based on a location of the target object in each of the at least one subset of the image frames, wherein the generating an area in each of the at least one subset of the image frames further comprises:

generating a first plurality of feature points in each of the at least one subset of the image frames based on a contour of the target object and a predetermined distance from the contour of the target object, wherein the target object comprises a human body comprised in the at least one subset of image frames of the video, generating a second plurality of feature points in a direction away from the target object and the first plurality of feature points, and generating the area in each of the at least one subset of the image frames based on the first plurality of feature points and the second plurality of feature points;

filling a visual material into the area in each of the at least one subset of the image frames, wherein the visual material comprises a picture; and generating an effect in the video by adjusting at least one attribute of the visual material based on the audio attribute data.

11. The electronic device according to claim 9, wherein the audio attribute data includes audio rhythmic intensity information, and wherein attributes of the visual material comprise a width, a brightness, and a display duration of the visual material.

12. The non-transitory computer-readable storage medium according to claim 10, wherein the audio attribute data includes audio rhythmic intensity information, and wherein attributes of the visual material comprise a width, a brightness, and a display duration of the visual material.

\* \* \* \* \*